(12) United States Patent
Hiraguchi

(10) Patent No.: US 6,702,217 B2
(45) Date of Patent: Mar. 9, 2004

(54) RECORDING TAPE CARTRIDGE AND DRIVE DEVICE THEREOF

(75) Inventor: Kazuo Hiraguchi, Kanagawa (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 0 days.

(21) Appl. No.: 10/197,605

(22) Filed: Jul. 18, 2002

(65) Prior Publication Data

US 2003/0019967 A1 Jan. 30, 2003

(30) Foreign Application Priority Data

Jul. 24, 2001 (JP) ........................................ 2001-223635

(51) Int. Cl.[7] ........................ G11B 15/66; G11B 23/107
(52) U.S. Cl. ................. 242/348.2; 242/332.4; 360/132
(58) Field of Search ................... 242/332.4, 348.2, 242/532.1, 582; 360/132

(56) References Cited

U.S. PATENT DOCUMENTS

| | | | | |
|---|---|---|---|---|
| 4,335,858 A | * | 6/1982 | Cranna | 242/332.4 |
| 4,852,825 A | * | 8/1989 | McGee et al. | 242/332.4 |
| 4,977,474 A | * | 12/1990 | Oishi et al. | 242/348.2 |
| 5,971,310 A | * | 10/1999 | Saliba et al. | 242/332.4 |
| 6,050,514 A | * | 4/2000 | Mansbridge | 242/332.7 |
| 6,311,915 B1 | * | 11/2001 | Rathweg | 242/332.4 |
| 6,445,539 B1 | * | 9/2002 | Morita et al. | 360/132 |
| 6,502,776 B2 | * | 1/2003 | Sogabe et al. | 242/332.4 |
| 2001/0024343 A1 | * | 9/2001 | Shiga et al. | 360/132 |

* cited by examiner

*Primary Examiner*—Kathy Matecki
*Assistant Examiner*—Evan Langdon
(74) *Attorney, Agent, or Firm*—Sughrue Mion, PLLC

(57) ABSTRACT

A recording tape cartridge used with a drive device that includes a pull-out member connectable at an end of a recording tape accommodated in the recording tape cartridge to pull out the recording tape. The recording tape cartridge comprises the recording tape, a case for accommodating a single reel wound with the recording tape and a leader member fixed at the end of the recording tape and having claw members that connect to the pull-out member when the recording tape is being pulled out. The claw member engages with a circulating groove formed at the pull-out member by the pull-out member being pressed against the leader member, and the claw member disengages from the circulating groove by a subsequent pressing, thereby allowing the end of the recording tape to be joined to and released from the pull-out member.

14 Claims, 3 Drawing Sheets

RECORDING TAPE CARTRIDGE AND DRIVE DEVICE THEREOF

BACKGROUND OF THE INVENTION

1. Field of the Invention

The present invention relates to a recording tape cartridge in which a single reel wound with a recording tape that is used as a recording/reproducing medium in a computer or the like is accommodated in a case, and also to a drive device used to drive the recording tape cartridge.

2. Description of the Related Art

A magnetic tape cartridge including a case accommodating a single reel wound with a magnetic tape that is used as a data recording/reproducing medium in a computer or the like has conventionally been known. The magnetic tape includes an end disposed with a leader member, such as a leader block, a leader pin, or a leader tape, that is pulled out from the cartridge by pull-out means (e.g., including claws or the like) of a drive device, whereby the magnetic tape is pulled out and wound onto a take-up reel at the drive device.

A reel gear is formed annularly at the center of a lower surface of the reel that appears from a hole formed in a lower surface of the magnetic tape cartridge, and a driving gear of the drive device meshes with the reel gear to thereby rotate the reel. Due to the reel of the magnetic tape cartridge and the take-up reel of the drive device being rotated synchronously, data can be recorded on the magnetic tape and data recorded on the magnetic tape can be reproduced.

FIG. 3A illustrates an example in which a conventional leader block 57 is used. The leader block 57 includes a recess 58 into which a pull-out pin 60 is inserted, to thereby engage the leader block 57 and pull out the magnetic tape to which the leader block 57 is fixed. FIG. 3B illustrates an example in which a conventional leader pin 64 is used. Pull-out means of the drive device (not shown) includes hooklike claws 62 that hook onto upper and lower ends of the leader pin 64, to thereby engage the leader pin 64 and pull out the magnetic tape to which the leader pin 64 is fixed.

However, when the leader member is thus hooked by a claw or the like and pulled out from the magnetic tape cartridge, the pull-out means is apt to become disengaged from the leader member. Therefore, there is the potential for the leader member to disengage from the pull-out means before it properly engages with the take-up reel of the drive device. Furthermore, in order to ensure that the pull-out means does not inadvertently become disengaged from the leader member, the structure of the drive device can sometimes become needlessly complicated and cost a great deal.

SUMMARY OF THE INVENTION

In view of the aforementioned circumstances, an object of the present invention is to provide a recording tape cartridge that allows a leader member pulled out from a case to be reliably engaged and fastened to a take-up reel of a drive device.

In order to achieve the aforementioned object of the present invention, a first aspect of the present invention is a recording tape cartridge used with a drive device that accommodates a recording tape cartridge and includes a pull-out member connectable at an end of a recording tape accommodated in the recording tape cartridge to pull out the recording tape, with the pull-out member including a circulating groove, said recording tape cartridge comprising: the recording tape; a case for accommodating a single reel wound with the recording tape; and a leader member fixed at the end of the recording tape and having claw members that connect to the pull-out member when the recording tape is being pulled out, wherein the claw member engages with the circulating groove of the pull-out member by the pull-out member being pressed against the leader member, and the claw member disengages from the circulating groove by a subsequent pressing, thereby allowing the end of the recording tape to be joined to and released from the pull-out member.

According to the first aspect of the present invention, the leader member and the pull-out means can be reliably and simply joined together. Therefore, the leader member can be reliably engaged and fastened to a take-up reel of the drive device. Furthermore, the structure of the drive device does not become complicated and costs do not increase.

A second aspect of the present invention is a drive device that accommodates a recording tape cartridge therein and performs at least one of reading out of information from and recording of information on a recording tape, the recording tape includes a leader member fixed at an end of the recording tape and having a claw member that is pulled out from the drive device by being connected to the drive device, said drive device comprising: a pull-out member connected to the end of the recording tape to pull out the recording tape, said pull-out member having a circulating groove for engaging with the claw member when the recording tape is being pulled out, thereby allowing the pull-out member and the leader member to be joined together.

DESCRIPTION OF THE PREFERRED EMBODIMENT

Description will be hereinafter given of an embodiment of the present invention with reference to the attached drawings.

Figure 1:
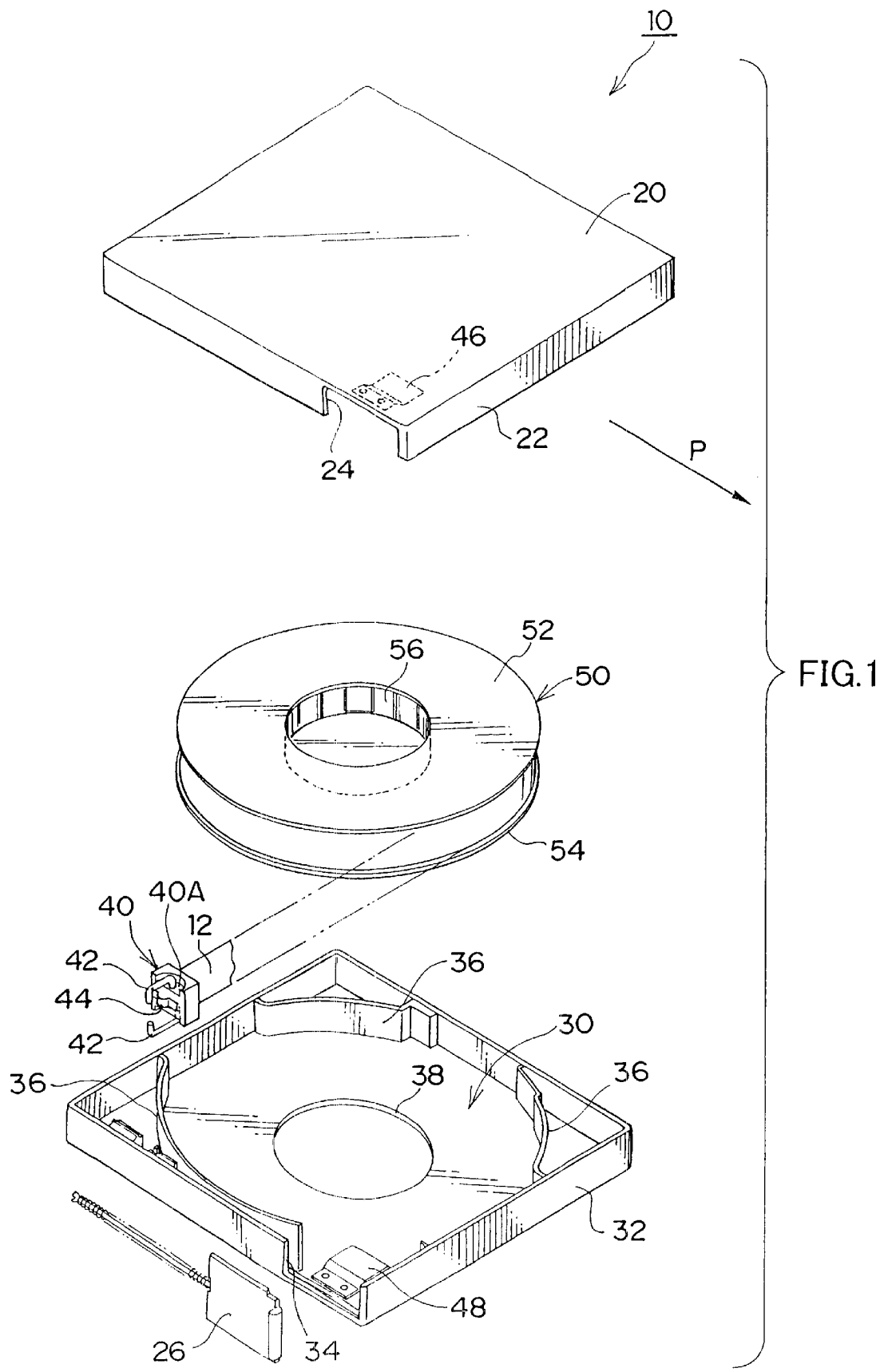
FIG. 1 is an exploded perspective view schematically showing a magnetic tape cartridge when seen obliquely from above.

As shown in FIG. 1, a magnetic tape cartridge 10 comprises an upper case 20 and a lower case 30 that are each made from synthetic resin. The upper case 20 includes a peripheral wall 22 and the lower case 30 includes a peripheral wall 32. The peripheral walls 22 and 32 are joined together by, for example, ultrasonic welding, whereby the magnetic tape cartridge 10 is formed as a substantially rectangular box. A single reel 50, on which a magnetic tape 12 serving as an information recording/reproducing medium is wound, is rotatably accommodated in the magnetic tape cartridge 10. Curved walls 36 are vertically disposed on inner bottom surfaces of each of the upper case 20 and the lower case 30 (in FIG. 1, the curved walls on the inner bottom surface of the upper case 20 are not shown). When the curved walls 36 of the upper case 20 are joined with the curved walls 36 of the lower case 30, they collectively form a substantially cylindrical wall inside of which the reel 50 accommodated.

A circular hole 38 is formed in a center of the bottom surface of the lower case 30, and a reel gear (not shown) provided annularly on a lower surface of the reel 50 appears from the hole 38. The reel 50 comprises a cylindrical hub 56 disposed with an upper flange 52 and a lower flange 54 that protrude radially outward from upper end and lower end peripheries of the hub 56. The lower flange 54 and the hub 56 are integrally formed from synthetic resin, and the upper flange 52 is joined to the hub 56 by ultrasonic welding or the like. The magnetic tape 12 is wound onto the hub 56.

As shown in FIG. 1, arrow P indicates a direction in which the magnetic tape cartridge 10 is loaded into a drive device (not shown). For convenience of explanation, the terms "front", "rear", "upper", "lower", and "left" (or "left-side") and "right" (or "right-side") used herein refer to orientations as one faces the direction indicated by P.

The peripheral wall 22 includes an opening 24 that is disposed towards a front right-hand side of the peripheral wall 22 (i.e., in the vicinity of a front right-hand side corner of the peripheral wall 22). The peripheral wall 32 includes an opening 34 that is disposed to correspond to the opening 24. The magnetic tape 12 is pulled out from the magnetic tape cartridge 10 through the openings 24 and 34. When the magnetic tape cartridge 10 is not in use, the openings 24 and 34 are closed off by a shutter 26. A pressing member 46 is disposed on the inner surface of the upper case 20 near the opening 24, and a pressing member 48 is disposed on the inner surface of the lower case 30 near the opening 34. The pressing members 46 and 48 have the shape of a plate spring, are urged inwards, and respectively press upper and lower surfaces of a blocklike (substantially rectangular parallelepiped) leader member 40. Thus, the pressing members 46 and 48, as a holding member, hold the leader member in the vicinity of the opening when the recording tape is not being pulled out.

Figure 2A:
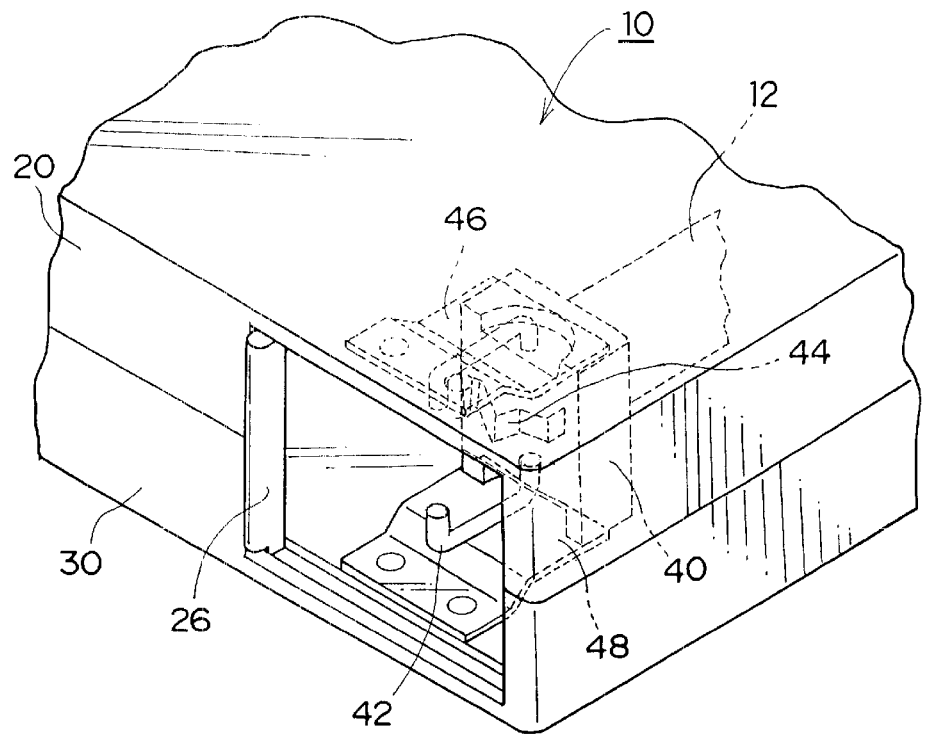
FIG. 2A is a perspective view schematically showing a leader member engaged in the magnetic tape cartridge.

A recess 40A having a substantially arc-shaped configuration when seen from above is provided at the upper and lower surfaces of the leader member 40 at the right side thereof, and an engaging claw 42 is rotatably supported in each of the recesses 40A. Each engaging claw 42 includes two ends, a right-side end and a left-side end. As shown in FIG. 2A, the right-side end of the upper engaging claw 42 disposed at the upper surface of the leader member 40 bends down to face the right-side end of the lower engaging claw 42 disposed on the lower surface of the leader member 40, which latter engaging claw 42 bends up. Similarly, the left-side end of the upper engaging claw 42 bends down and the left-side end of the lower engaging claw 42 bends up. The left-side ends of the engaging claws 42 are respectively supported in the recesses 40A. Further, a plate spring 44 comprising a striplike spring member and that is bent at an intermediate portion thereof protrudes from a right-side surface of the leader member 40, and the magnetic tape 12 is fixed to a left-side surface of the leader member 40. The plate spring 44 may be replaced by a spring inserted in a hole formed at the center of the right-side surface of the leader member 40.

Figure 2B:
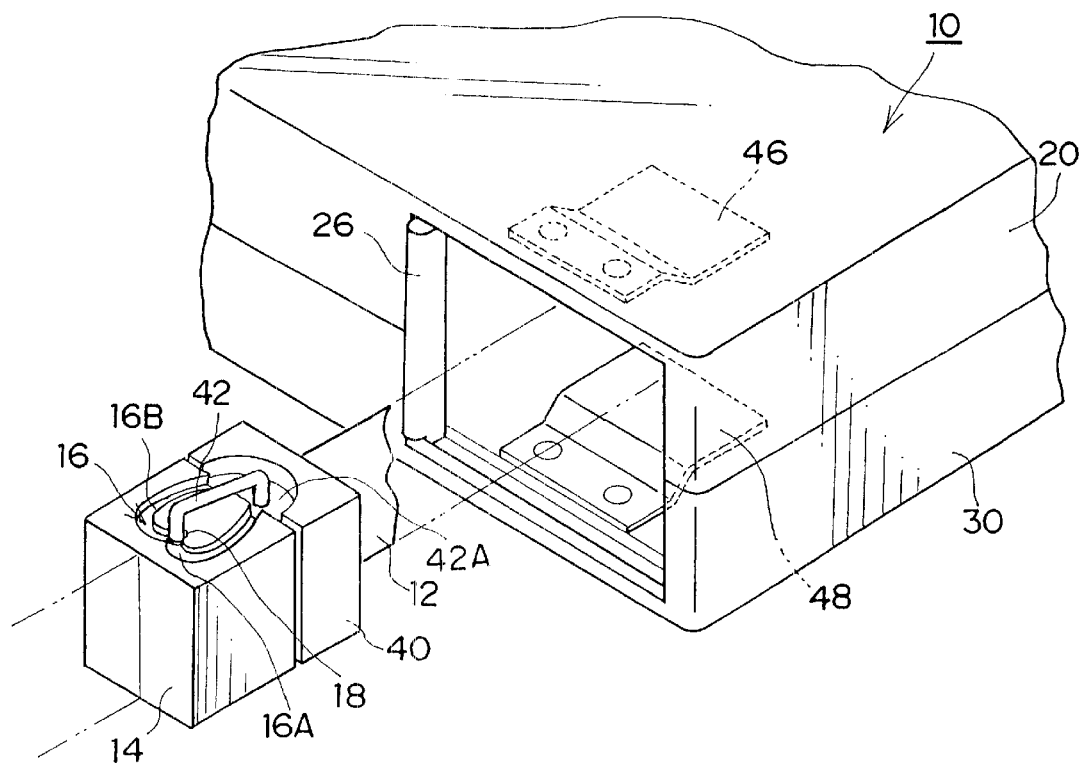
FIG. 2B is a perspective view schematically showing the leader member pulled out by a pull-out member of a drive device.
Figure 3A:
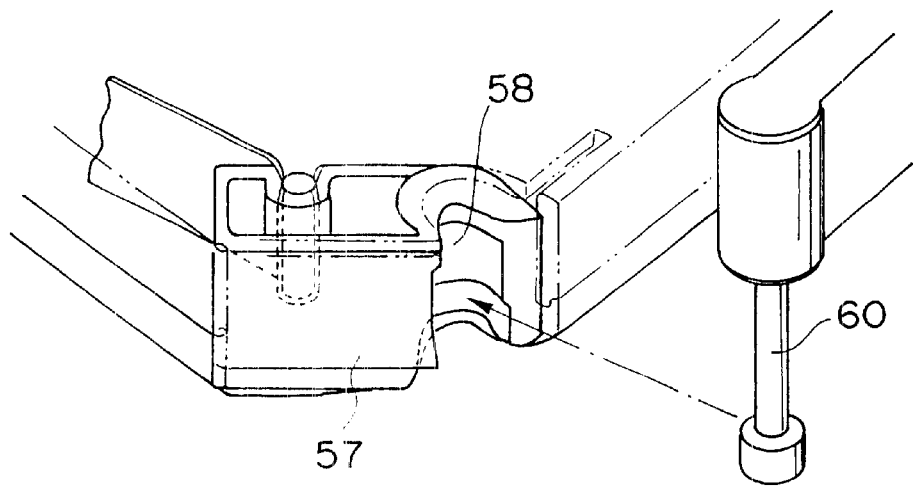
FIG. 3A is a perspective view schematically showing a conventional leader block engaged in a magnetic tape cartridge and a pull-out pin of a drive device.
Figure 3B:
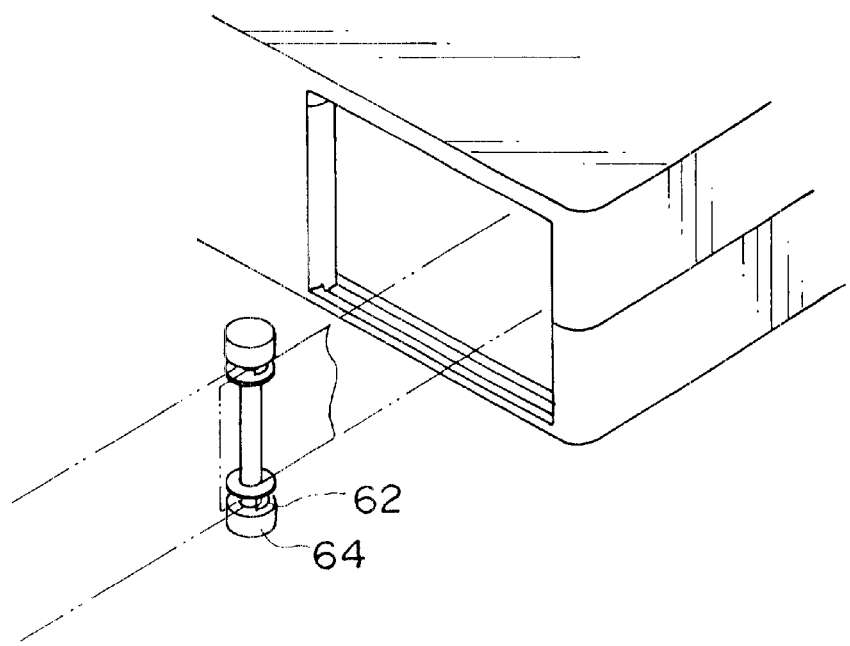
FIG. 3B is a perspective view schematically showing a conventional leader pin pulled out from a magnetic tape cartridge.

As shown in FIG. 2B, the engaging claws 42 detachably engage with circulating cam grooves 16 provided on upper and lower surfaces of a pull-out member 14 of a drive device (not shown). Each circulating cam groove 16 has a substantially heart-shaped configuration, which has a starting end at the side of the surface facing the leader member, circulates on each surface of the pull-out member 14, and also has a terminating end at the side of the surface facing the leader member, which terminating end is different from the starting end. The engaging claw 42 removably engages (latches) therewith. The circulating cam groove 16 comprises a circulating cam groove 16A and a circulating cam groove 16B. The depth of the circulating cam groove 16 varies at either side of an engaging portion 18 formed at a substantially intermediate portion of the circulating cam groove 16. In other words, the depth of the circulating cam groove 16B is greater than the depth of the circulating cam groove 16A.

When the pull-out member 14 is moved and abuts against the right-side surface of the leader member 40, the right-side end of the engaging claw 42 first engages with and slides along the shallow circulating cam groove 16A. At the same time, the pull-out member 14 is pushed by the plate spring 44 in a direction away from the leader member 40. Therefore, the end of the engaging claw 42 falls into the engaging portion 18 and is engaged and fixed therein. As a result, the leader member 40 and the pull-out member 14 are joined together.

When the leader member 40 is released from the pull-out member 14, the pull-out member 14 is pushed toward the leader member 40 counter to the urging force of the plate spring 44. As a result, the end of the engaging claw 42 disengages from the engaging portion 18 and slides along the deep circulating cam groove 16B. The leader member 40 and the pull-out member 14 are also released from the joining state.

The leader member 40 and the pull-out member 14 can be reliably joined together in a simple manner by latching. The leader member 40 cannot be disengaged from the pull-out member 14 unless the pull-out member 14 is pushed and moved toward the leader member 40. Accordingly, when the leader member 40 is moved toward a take-up reel (not shown) of the drive device, there is not the problem of the leader member 40 becoming separated from the pull-out member 14. As a result, the leader member 40 can be reliably engaged and fastened to the take-up reel. Further, the structure of the drive device does not become complicated and costs do not increase.

It should be noted that the plate spring 44 may also be provided in the pull-out member 14 and not in the leader member 40, and that the latching mechanism is not limited to the one illustrated herein.

Next, the operation of the magnetic tape cartridge 10 will be described. When the magnetic tape cartridge 10 is not in use, the leader member 40 fixed at the leading end of the magnetic tape 12 is held and fixed by the pressing members 46 and 48 in the vicinity of the openings 24 and 34. When the magnetic tape cartridge 10 is in use, the pull-out member 14 provided at the drive device is moved abuts against the right-side surface of the leader member 40. As a result, the right-side end of the engaging claw 42 engages with and slides along the circulating cam groove 16A to the engaging portion 18. Then, the pull-out member 14 and the leader member 40 are joined together by the urging force of the plate spring 44 (see FIG. 2B).

When the pull-out member 14 is moved toward the take-up reel, the leader member 40 is pulled out from the magnetic tape cartridge 10. At this time, the pull-out member 14 is not pushed and moved toward the leader member 40. Therefore, there is no potential for the leader member 40 to become disengaged from the pull-out member 14. Accordingly, the leader member 40 is reliably engaged and fastened to the take-up reel and the magnetic tape 12 can be wound onto the take-up reel.

When the magnetic tape 12 is rewound from the take-up reel and the magnetic tape cartridge 10 is removed from the drive device, the leader member 40 is first held and fixed by the pressing members 46 and 48 as it is joined with the pull-out member 14. When the pull-out member 14 is pushed and moved toward the leader member 40 counter to the urging force of the plate spring 44, the right-side end of the engaging claw 42 is disengaged from the engaging portion 18 and slides along the circulating cam groove 16B. As a result, the leader member 40 is disengaged from the pull-out member 14.

As described above, the present invention allows pull-out means at a drive device to be reliably and simply joined to a leader member, thereby, the leader member can be reliably engaged and fastened to a take-up reel at the drive device. Furthermore, the structure of the drive device dose not become complicated and costs do not increase.

What is claimed is:

1. A recording tape cartridge used with a drive device that accommodates a recording tape cartridge and includes a pull-out member connectable at an end of a recording tape accommodated in the recording tape cartridge to pull out the recording tape, with the pull-out member having two surfaces, each of the two surfaces having a circulating groove formed thereon, each circulating groove formed so as to circulate on its respective surface and including a starting end and a terminating end at the side edge of its respective surface, which side edge is at a side of the end of the recording tape, each starting end and terminating end being different from each other, said recording tape cartridge comprising:

the recording tape;

a case for accommodating a single reel wound with the recording tape; and a leader member fixed at the end of the recording tape and having a claw member that connects to the pull-out member when the recording tape is being pulled out, wherein the claw member engages with at least one of the circulating grooves of the pull-out member by the pull-out member being moved in a first direction relative to the leader member, and the claw member disengages from the at least one circulating groove by a subsequent pressing, thereby allowing the end of the recording tape to be joined to and released from the pull-out member.

2. The recording tape cartridge of claim 1, wherein the case includes an opening from which the recording tape is pulled out and a holding member for holding the leader member in the vicinity of the opening when the recording tape is not being pulled out.

3. The recording tape cartridge of claim 2, wherein the holding member comprises pressing members that press two mutually opposite surfaces of the leader member, the two mutually opposite surfaces being top and bottom surfaces or mutually opposite side surfaces.

4. The recording tape cartridge of claim 1, wherein claw members respectively protrude from two mutually opposite surfaces of the leader member, the two mutually opposite surfaces being top and bottom surfaces or mutually opposite side surfaces.

5. The recording tape cartridge of claim 4, wherein the claw members have ends protruding from the surfaces and the protruding ends bend to face each other.

6. The recording tape cartridge of claim 1, wherein the claw member is rotatably supported by the leader member.

7. The recording tape cartridge of claim 1, wherein the leader member includes a pressing member for pressing the pull-out member in a direction away from the leader member when the leader member is joined to the pull-out member.

8. The recording tape cartridge of claim 7, wherein the pressing member comprises a spring.

9. The recording tape cartridge of claim 4, wherein the circulating grooves are formed in two mutually opposite surfaces of the pull-out member, the two mutually opposite surfaces being top and bottom surfaces or mutually opposite side surfaces.

10. The recording tape cartridge of claim 9, wherein the surfaces of the pull-out member on which the circulating grooves are formed respectively correspond to the surfaces of the leading member from which the claw members protrude.

11. The recording tape cartridge of claim 10, wherein the circulating groove on each of the two surfaces of the pull-out member has the starting end and the terminating end at the side edge of each of the two surfaces, which side edge is at a side of a surface of the pull-out member, which surface faces the leader member.

12. The recording tape cartridge of claim 1, wherein each of the circulating grooves has an engaging portion for engaging the claw member when the recording tape is being pulled out.

13. The recording tape cartridge of claim 12, wherein each of the circulating grooves is formed such that the depth thereof varies at either side of the engaging portion.

14. A drive device that accommodates a recording tape cartridge therein and performs at least one of reading out of information from and recording of information on a recording tape, the recording tape including a leader member fixed at an end of the recording tape and having a claw member that is pulled out from the recording tape cartridge by being connected to the drive device, said drive device comprising:

a pull-out member connected to the end of the recording tape to pull out the recording tape, said pull out member having a circulating groove for engaging with the claw member when the recording tape is being pulled out, thereby allowing the pull-out member and the leader member to be joined together, said pull-out member having two surfaces with a circulating groove formed on each of the two surfaces, each circulating groove formed so as to circulate on its respective surface and including a starting end and a terminating end at the side edge of its respective surface, which side edge is at a side of the end of the recording tape, each starting end and terminating end being different from each other.

* * * * *